(12) United States Patent
Shang et al.

(10) Patent No.: US 9,760,617 B2
(45) Date of Patent: Sep. 12, 2017

(54) APPLYING TRANSACTION LOG IN PARALLEL

(71) Applicants: Heping Shang, Dublin, CA (US); Guo Gang Ye, Shanghai (CN); Zheng-wei Wang, Shanghai (CN)

(72) Inventors: Heping Shang, Dublin, CA (US); Guo Gang Ye, Shanghai (CN); Zheng-wei Wang, Shanghai (CN)

(73) Assignee: SAP SE, Walldorf (DE)

( * ) Notice: Subject to any disclaimer, the term of this patent is extended or adjusted under 35 U.S.C. 154(b) by 219 days.

(21) Appl. No.: 14/290,421

(22) Filed: May 29, 2014

(65) Prior Publication Data

US 2015/0347551 A1 Dec. 3, 2015

(51) Int. Cl.
*G06F 17/30* (2006.01)

(52) U.S. Cl.
CPC .............................. *G06F 17/30578* (2013.01)

(58) Field of Classification Search
USPC ................................................. 707/615, 737
See application file for complete search history.

(56) References Cited

U.S. PATENT DOCUMENTS

| | | | | |
|---|---|---|---|---|
| 7,376,675 B2* | 5/2008 | Pruet, III | .......... | G06F 17/30362 707/615 |
| 8,032,885 B2* | 10/2011 | Fish | .................. | G06F 17/30575 718/101 |
| 8,214,353 B2* | 7/2012 | Inturi | ................ | G06F 17/30297 704/9 |
| 8,428,983 B2* | 4/2013 | Bobak | .................... | G06Q 10/06 705/7.11 |
| 8,666,939 B2* | 3/2014 | O'Krafka | .......... | G06F 17/30578 707/615 |
| 8,738,568 B2* | 5/2014 | Ghosh | ............... | G06F 17/30581 707/615 |
| 8,996,458 B2* | 3/2015 | Shang | ................. | G06F 11/2094 702/181 |
| 2005/0192989 A1* | 9/2005 | Adiba | ............... | G06F 17/30371 |
| 2008/0163222 A1* | 7/2008 | Bourbonnais | ..... | G06F 17/30578 718/101 |
| 2010/0074443 A1* | 3/2010 | Ishii | ........................ | G09C 5/00 380/243 |

* cited by examiner

*Primary Examiner* — Kim Nguyen
(74) *Attorney, Agent, or Firm* — Sterne, Kessler, Goldstein & Fox P.L.L.C.

(57) ABSTRACT

System, method, computer program product embodiments and combinations and sub-combinations thereof for data replication in a database system environment are described. In an aspect, the data replication includes grouping, in-memory, a plurality of transactions to be replicated as a single transaction from a source database system to a target database system. A plurality of net row changes is compiled for the plurality of transactions, and data inconsistency detection and resolution within a command application order are performed. The plurality of net row changes are organized in segments and the segments can be applied simultaneously in bulk to the target database system.

17 Claims, 5 Drawing Sheets

APPLYING TRANSACTION LOG IN PARALLEL

BACKGROUND

Databases can maintain critical information vital to a given business or organization. The loss of data in a database due to natural disasters, data corruption, etc., can be catastrophic to the business. In order to guard against the loss of critical business data maintained in a given database (the "primary database"), a replicate database or multiple replicate databases can be maintained. A replicate database is a duplicate or mirror copy of the primary database (or a subset of the primary database) that is maintained either locally at the same site as the primary database, or remotely at a different location than the primary database. The availability of a replicate copy of the primary database enables a user (e.g., a corporation or other business) to reconstruct a copy of the database in the event of the loss, destruction, or unavailability of the primary database. Replicate databases, however, can take more time to update than a primary database.

BRIEF DESCRIPTION OF THE DRAWINGS/FIGURES

The accompanying drawings, which are incorporated herein and form part of the specification, illustrate embodiments of the present disclosure and, together with the description, further serve to explain the principles of the disclosure and to enable a person skilled in the relevant art(s) to make and use the techniques described throughout the disclosure.

The features and advantages of the present disclosure will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

The present disclosure relates to a system, method, computer program product embodiments and combinations and sub-combinations thereof for providing methodology for high volume, high speed adaptive data replication.

Figure 1:
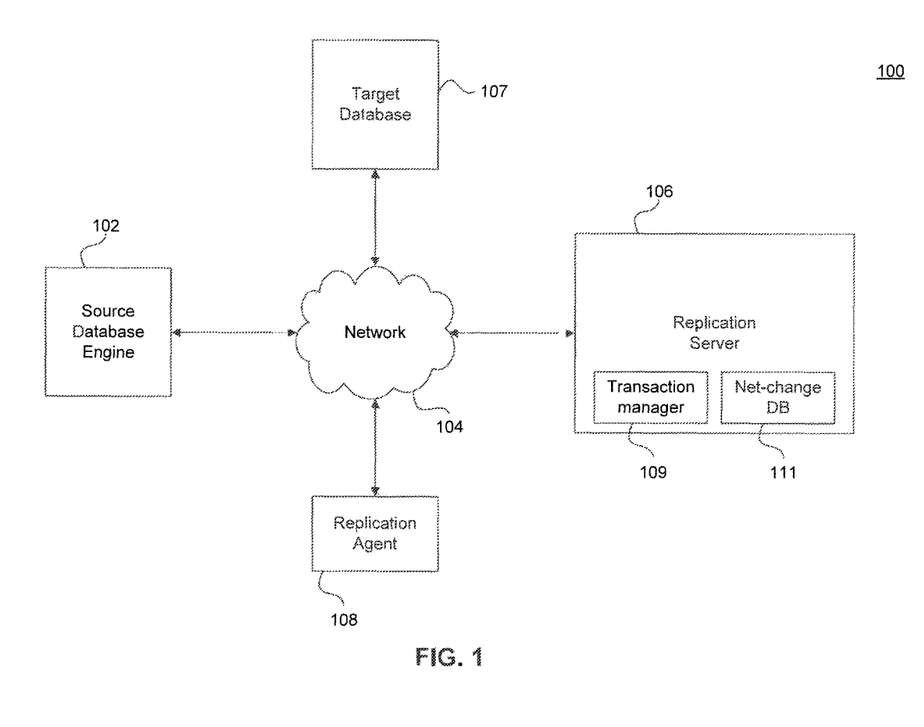
FIG. 1 illustrates a database network that employs a transaction compiler, in accordance with an embodiment of the present disclosure.

FIG. 1 illustrates a database network 100 that employs a transaction compiler, in accordance with an embodiment of the present disclosure. A source database engine 102 is able to communicate over network 104 with replication server 106 via replication agent 108, in accordance with an embodiment of the present disclosure.

Network 104 can be any type of network or combination of networks such as, but not limited to, a local area network, wide area network, or the Internet. Network 104 may be any form of a wired network or a wireless network, or a combination thereof.

Also in communication over network 104 is a replication agent 108. The replication agent 108 facilitates the replication process by, in accordance with an embodiment of the present disclosure, scanning a transaction log for changes at source database engine 102 and sending those changes to replication server 106. One skilled in the relevant arts will further recognize that the network 104 can be configured in a number of ways in order to achieve the same result, and the aforementioned configuration is shown by way of example, and not limitation. For instance, in accordance with an embodiment of the present disclosure, replication agent 108 and source database engine 102 are located in a single physical computing device or cluster of computing devices.

Source database engine 102 comprises a source database and a transaction log, in accordance with an embodiment of the present disclosure. Transactional operations, including inserts, updates, and deletes to the database, causes a log record to be written to the transaction (primary) log, which is commonly referred to simply as the "log." Each particular log record characterizes the change that occurred to the source database during processing of a transaction. These log records can be used, for instance, in error recovery, to restore the database to a preexisting, consistent state.

Changes to the source database 102 are sent to replication server 106 over network 104, which then applies these changes, over network 104, directly to target database 107. As is commonly understood, the replication server 106 transfers the data from an outbound queue to the target database 107. As discussed further below, a transaction manager 109 that is part of the replication sever 106 can read a transaction log generated at the primary database and can compile the transaction log into a net-change database 111. The net-change database 111 is the product of the transaction manager 109 compiling the transaction log into net-changes (see below).

Database network 100 provides an approach to replication for high volume and high speed that is adaptive to the conditions of the data being replicated to improve upon traditional replication.

Figure 2:
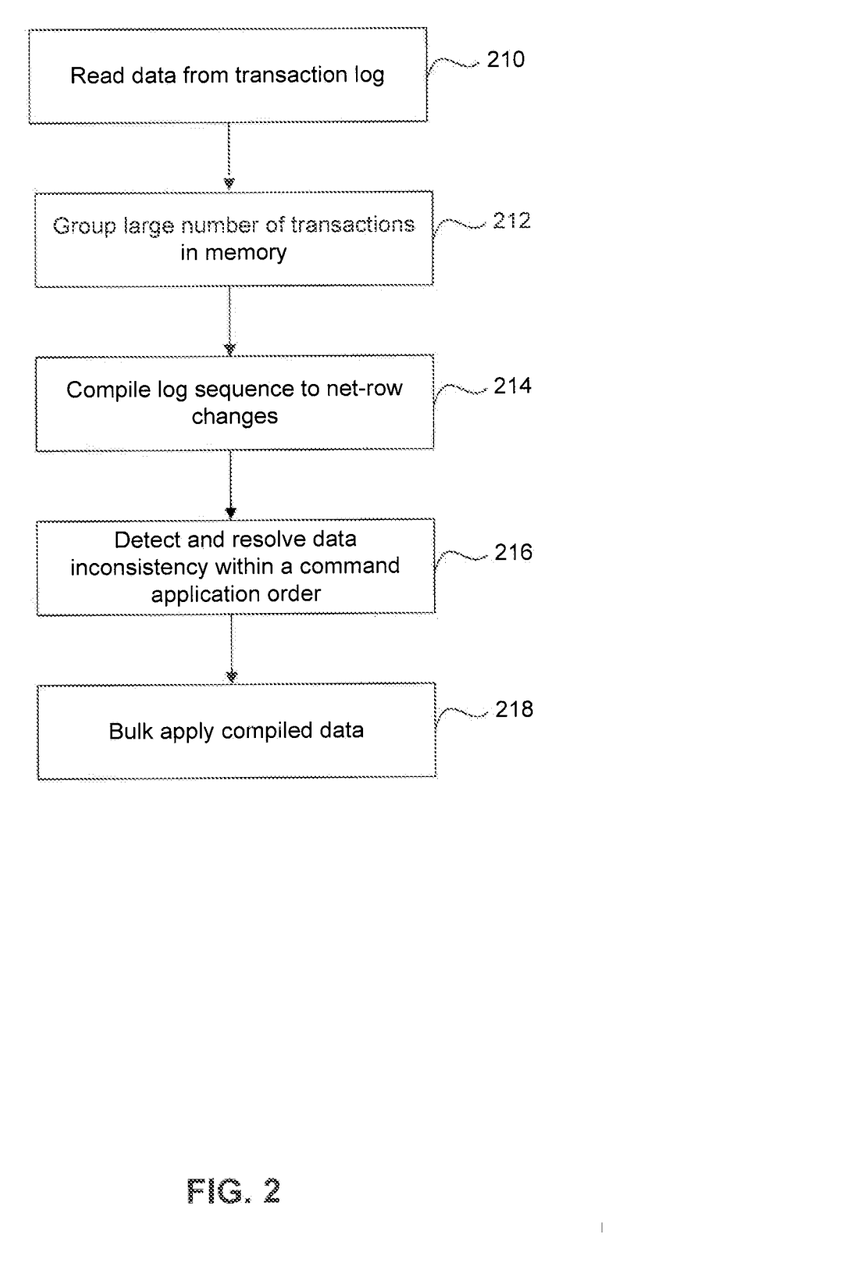
FIG. 2 is a flowchart illustrating a method by which a replication server facilitates high volume, high speed adaptive replication, in accordance with an embodiment of the present disclosure.

Referring now to FIG. 2, a block flow diagram of a method for replication in accordance with embodiments of the disclosure is illustrated. The method initiates at 210 with the reading of transaction log data by the transaction manager 109. Once read, a number of transactions are grouped (block 212) into a single transaction.

In an embodiment, the replication server 106 uses parameters to determine when to start and stop transaction grouping. For example, a parameter (e.g., dsi_compile_max_cmds), can be provided to specify the number of transactions to be grouped in a single transaction. For example, the parameter can be used to specify when replication should finish a current transaction grouping and start a new group, for example, 100,000 transactions. Similarly, if there is no more data to read, the current grouping can be finished regardless of whether the grouping has reached the maximum size as specified by the dsi_compile_max_cmds. Stopping may also occur when a transaction is encountered that contains non-compilable commands. Examples of non-compilable commands include function (stored procedure), SQL statement (SQL statement replication), DDL (data definition language), system transaction, internal markers, and the like. In general, replication groups as many transactions as possible. Further, the grouping occurs such that transactions of different origins can be grouped together.

At block 214, the replication server (e.g., the transaction manager 109 in replication server 106 of FIG. 1) further compiles a transaction and converts log order row changes to net-row changes (block 214). Examples of net-row changes will be provided further below. In accordance with embodiments of the disclosure, the net row changes are saved in a net-change database 111, which can include mixed commands, some compiled and stored into tables, namely, an insert table, update table, and delete table, and some non-compiled and stored in log sequence. In some examples, the net-change database 11 can also store a log-sequence table which can keep the transactions in their original sequence for the purposes of recovery. Further, the net-change database can be provided as an internal implementation, or alternatively, utilizing an embedded light weight in-memory database. As an internal implementation, the net-change database 111 provides high performance and avoids being a replication performance bottleneck while supporting multiple database instances, where each instance contains multiple sets of insert/update/delete tables, and each replicate table has one set of insert/update/delete tables. Access support to the net-change database 111 by external processes through Open Client interfaces allows simplified "select" statements to be used with administration, maintenance, diagnostic, and the like done through additional system administration commands, as is well appreciated by those skilled in the art. As can be further appreciated, accessibility by internal modules can occur through 'C' language functions, such that callers can create, clone, and/or drop a database instance, insert an inserted/update/deleted row to a database instance, or select an internal table from a database instance.

In order to determine the net row changes for storing in the net change database 111, the changes of the source database engine 102 are tracked. In accordance with embodiments of the disclosure, when tracking inserts during the replication process, each inserted row is added to the insert table. In normal cases, the inserted row should not already exist in the insert table. If it does already exist (i.e., there is a duplicate key violation), an error can be raised.

The replication process also tracks updates in an update table based on before and after images of the update. For example, if the update before image matches an after image in the update table, the after image of the existing update row is replaced with the after image of the newly updated row. If the update before image matches a row in the insert table, the row in the insert table is replaced with the after image. If the update before image matches a before image of the update table or exists in the delete table (update zero row), or the update after image exists in the insert table (duplicate key violation), an error is reported. Exceptions to the update tracking occur, for example, if an auto-correction setting is active. In this case, updates are converted to deletes followed by inserts. Or, if a table has no replication definition, its updates will be converted to deletes followed by inserts. Alternatively, if an update changes primary keys, the update is converted to a before image delete and an after image insert.

When tracking deletes, if the delete row exists in the internal insert table, the row is removed from the insert table. If the delete row matches an after image in the internal update table, the matching update row is removed from the update table. If the delete row matches a before image in the update table or exists in the delete table (delete zero row), an error is reported. Once verified against these possibilities in this manner, the delete row is inserted to the delete table of the net change database 111.

Once the tracking completes and the net row changes are compiled, the command order to be applied may cause data inconsistencies. Detection and resolution of these inconsistencies within the command application order are performed (block 216), such that the inconsistencies can be avoided through command reordering. For example, since a compiled transaction can contain multiple replicated tables and each replication table can have up to three net change tables, detection is based at least in part on referential constraints. Thus, if table A references table B, deletes to table A should be applied before table B, and inserts to table A should be applied after table B. In this manner, resolvable referential constraints are able to be applied according to the replication processing order, while non-resolvable referential constraints are made non-compilable and are able to be applied in their log sequence.

Following detection and resolution, bulk application of the net-change database occurs (block 218) to the target database 107. In general, deletes need to be applied before inserts and updates can be applied in any order. For tables with referential constraints, inserts to parent tables should be applied first and deletes to child tables should be applied first. In an embodiment the whole application process is wrapped in a single transaction. If the transaction fails during the application process, the transaction is regrouped into several smaller transactions to be tried one by one, which continues until the failing transaction is successfully identified. Once found, the transaction is retried, with the appropriate error action taken as specified by the connection error class.

Alternatively, for example, replication can be performed such that the target database is allowed to pull data from the replication server, e.g., by allowing the target database to treat the replication server as a remote database and be able to select the insert and delete tables from the replication server.

In an alternate embodiment, for a target database 107 that does not support bulk update/delete interfaces, work tables (i.e., segments) are employed in the target database 107. For example, the rows from the replicate tables are deleted by joining them with the delete work tables. Similarly, update tables are bulk copied into work tables in the target database 107, and then the replicate tables are updated by joining them with the work tables.

Further alternatives are possible to achieve optimal replication throughput. For example, when an environment supports tables that can be loaded quickly by methods such as ODBC (open database connectivity), the method can be used to create the work tables. In other environments, tempdb (temporary database) space, which usually is on fast devices, can be used to create the work tables. Further, by putting net-row changes in a single table having an extra column to indicate the row operation, one work table can be loaded instead of three, with 'select into' and 'join' operations used to populate net changes to the replicate table, as is well appreciated by those skilled in the art. Another alternative is to reduce update tables to changed columns only. By not including unchanged columns in work tables, the load and join costs are reduced. Additionally, for databases that support bulk update and delete operations, update and delete tables can be directly bulk applied to the target databases 107.

As described, instead of replaying every row change made at the primary database (e.g., source database), in accordance with embodiments of the disclosure, replication applies only the net row changes of a transaction. While transactional consistency is still guaranteed, intermediate row changes will be skipped, according to one embodiment.

The following example is provided to help illustrate the replication processing, for example, as described in FIG. 2.

Table A: (k1, c1, c2)
Table B: (k2, v1, v2, v3, v4)
with a log sequence of:
Begin transaction
Insert A values (1, 1, 1)
Insert A values (2, 2, 2)
Commit transaction
Begin transaction
Insert B values (10, 10, 10, 10, 10)
Insert B values (20, 20, 20, 20, 20)
Insert B values (30, 30, 30, 30, 30)
Commit transaction
Begin transaction
Delete A where k1=2
Delete A where k1=3
Update A set c1=10 where k1=1
Update A set c2=20 where k1=1
Update A set c1=1, c2=2 where k1=10
Commit transaction
Begin transaction
Update B set v1=11 where k2=10
Update B set v2=11 where k2=10
Update B set v1=21, v2=21 where k2=20
Update B set v1=12 where k2=10
Update B set v4=40 where k2=30
Commit transaction After reading this log sequence (block 210, FIG. 2), the transaction grouping (block 212) results in:
Begin transaction
Insert A values (1, 1, 1)
Insert A values (2, 2, 2)
insert B values (10, 10, 10, 10, 10)
Insert B values (20, 20, 20, 20, 20)
Insert B values (30, 30, 30, 30, 30)
Delete A where k1=2
Delete A where k1=3
Update A set c1=10 where k1=1
Update A set c2=20 where k1=1
Update A set c1=1, c2=2 where k1=10
Update B set v1=11 where k2=10
Update B set v2=11 where k2=10
Update B set v1=21, v2=21 where k2=20
Update B set v1=12 where k2=10
Update B set v4=40 where k2=30
Commit transaction Compilation (block 214) results in:
Insert A values (1, 10, 20)
Delete A where k1=3
Update A set c1=1, c2=2 where k1=10
Insert B values (10, 12, 11, 10, 10)
Insert B values (20, 21, 21, 20, 20)
Insert B values (30, 30, 30, 30, 40)

Detection and resolution of data inconsistency with the command application order (block 216) and application (218) follow to replicate the log sequence as:
Delete A were k1=3
Insert A values (1, 10, 20)
Insert B values (10, 12, 11, 10, 10)
Insert B values (20, 21, 21, 20, 20)
Insert B values (30, 30, 30, 30, 40)
Update A set c1=1, c=22 where k1=10

In an embodiment, table level configuration parameters are utilized to support modifications of the processing and are stored in a table of the replication server 106. Unlike database level parameters that impact an entire replicate database, table level parameters work only on the specified replicate tables. In a preferred embodiment, if a parameter can be specified at both the table level and the database level, the table level takes high precedence over the database level. Further, if a table level parameter is not specified, the parameter defaults to the database level setting.

By way of example, one such parameter, can be used to turn on/off compilation, which allows control, should replicating net row changes cause unexpected consequences. Another parameter can be used to specify how a replicate command can be converted, such as by values including "i" for insert, "u" for update, "d" for delete, "t" for truncate table and "none" for none operation. In this manner, for example, specifying "d2none" would indicate do not replicate delete command, while "i2di,u2di" would indicate convert both insert and update to delete followed by insert. Specifying "t2none" would indicate a do not replicate truncate table command.

As previously described, replication also accounts for referential constraints based on a specified definition and will retry the transaction in log sequence when necessary. During the bulk applying time, replication loads inserts (or deletes) to the referenced tables before (or after) the replication definition table. If multiple referential constraints are specified, such that there is a circular referential situation, the replication server 106 arbitrarily picks a break in the loop. In an embodiment, the system table of the replication server 106 is changed to include two new columns (e.g., ref_objname and ref_objowner), to accommodate referential constraints.

To avoid replication retry, which has a big performance impact, referential constraints can be disabled at the target database, or replication updates can be altered by converting updates to deletes and inserts, or to turn off the compilation to avoid compiling the trouble tables.

Further, incremental compilation can be used to compile a transaction up to a certain point before invoking the applying process to apply what has been compiled to that point. When the applying process returns, incremental compilation resumes and continues the process up to a new stop point. Such incremental compilation may be needed when there are transactions that contain non-compilable commands and transactions that cannot fit in memory.

Thus, through the embodiments and aspects of the disclosure, replication performance for database warehousing or reporting systems can be done faster than traditional continuous mode replication techniques. Further, the disclosure improves upon staging-type approaches by avoiding the use of an external staging database, providing improved usability with no need to suspend replication (e.g., by way of automatic scheduling), and reducing maintenance costs (e.g., by way of not requiring external scripts). Additionally, no application replication change is required. Transactional consistency is achieved with continuous data flow and significant replication throughput improvement.

The method and processes described above can lead to faster replication of a primary database by reducing the number of transactions that should occur in order to create a replicate database. By processing a transaction log to create a net-changes database, the replicate database can be created efficiently with the least number of transactions required.

Primary databases can be modified by transactions concurrently. As an example, while one user is inserting or updating data in Table A, another user of the database can issue commands to insert data and update data in Table B. Since each user's actions are operating on mutually exclusive portions of the database, the modifications can be performed on the primary database simultaneously (i.e., at the same time). However, the transaction log generated for the primary database is generated in a serial fashion (i.e., the actions on Table A will appear in the log as occurring before or after the actions on Table B). Thus in a replication system that employs a transaction log to create and modify the replicate database, the modifications to the replicate database will occur one transaction at time in an order specified by the transaction log. Since actions on the primary database can occur simultaneously (i.e., in parallel) while actions on the replicate database occur in order as listed on the log (i.e., serially) the replicate log will take more time to modify than the primary database. Furthermore, at the primary database, users can only optimize operations that are happening at the time that they are effecting transactions on the primary database. Individual users do not know what future operations will occur on the database, and therefore the system does not know whether to apply a user's transaction now or wait for more transactions from other users and apply the transactions concurrently. In order to increase the speed in which the replicate database is modified and also improve the efficiency of the replicated database with respect to the primary database, a transaction coordinator can be employed to read the compiled transaction log and determine when operations to the replicate database can be performed in parallel thus speeding up the process of modifying the replicate log.

Figure 3:
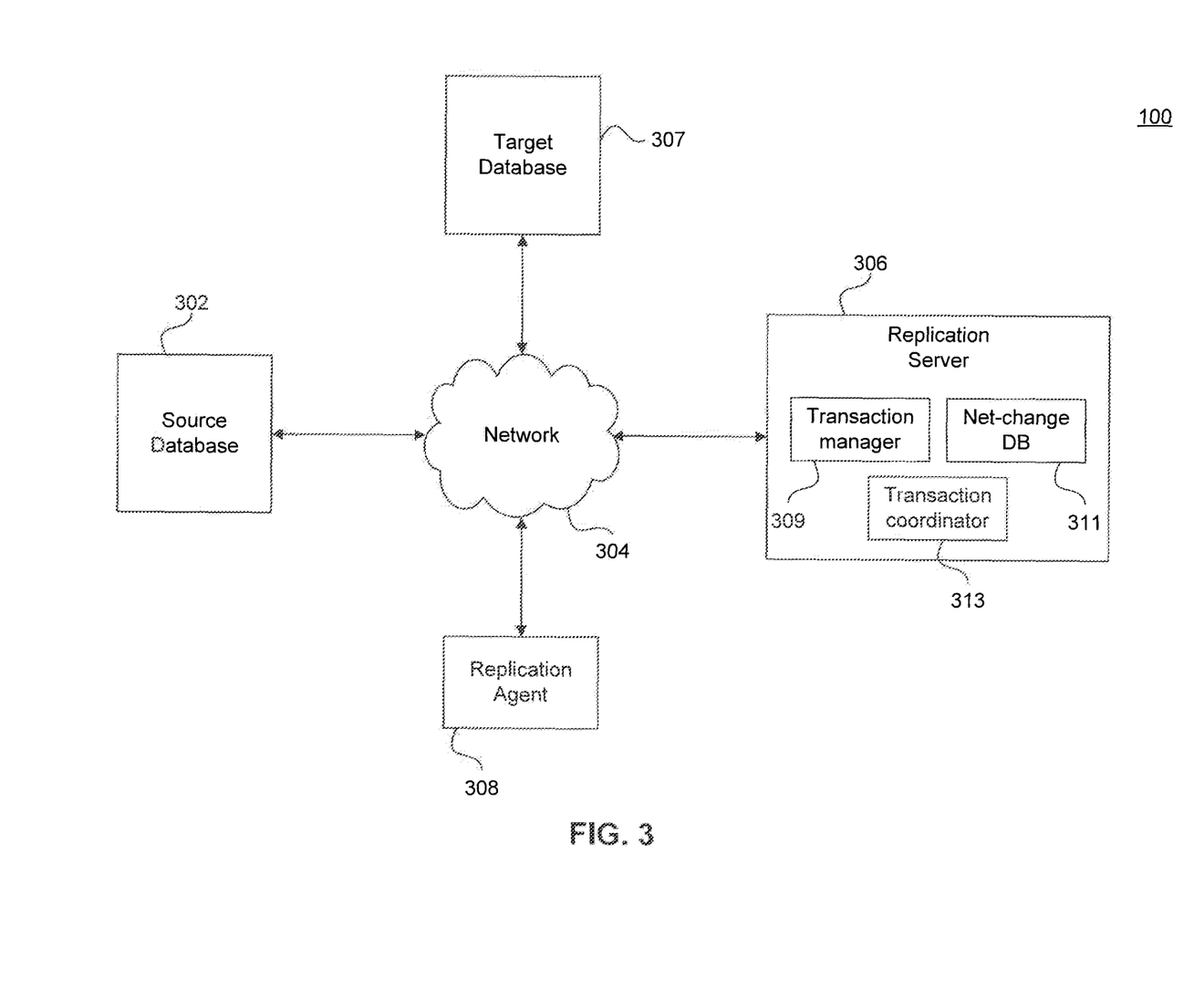
FIG. 3 illustrates a network that employs a transaction coordinator to modify portions of the replicate database using parallel transactions according to embodiments of the disclosure.

FIG. 3 illustrates a network 300 that employs a transaction coordinator to modify portions of the replicate database using parallel transactions according to embodiments of the disclosure. The network 300 can modify the replicate database (i.e., the target database 307) in a similar manner as the network 104 illustrated in FIG. 1. The transaction manager 309 can work to compile transactions from the transaction log into net row changes and store the net row changes into the net change database 311. Once the net change database 311 has been compiled (as described above), a transaction coordinator 313 can determine in which order to apply the net row changes stored in the net-change database, and can determine which net row changes can be applied concurrently.

In some embodiments the transaction coordinator 313 can operate on the transaction log created by the source database 302 that are sent via network 304 directly, without net row changes being determined by transaction manager 304.

Figure 4:
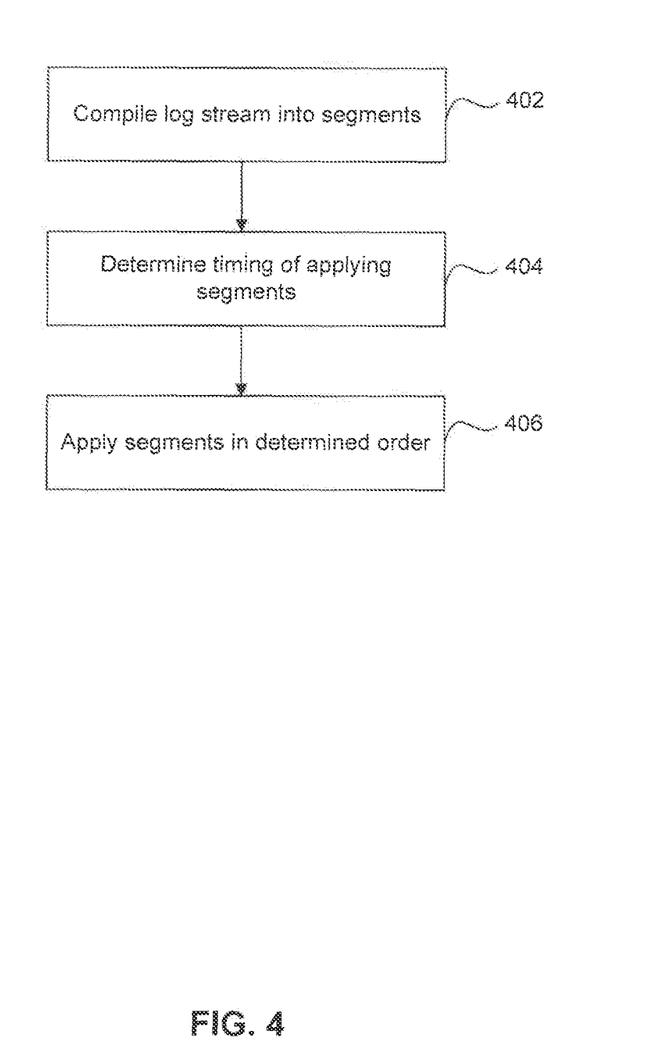
FIG. 4 is a flowchart illustrating a method by which a replication server facilitates high volume, high speed adaptive replication using parallel transactions, in accordance with an embodiment of the present disclosure.

FIG. 4 is a flowchart illustrating a method by which a replication server facilitates high volume, high speed adaptive replication using parallel transactions, in accordance with an embodiment of the present disclosure. Method 400 can be performed by processing logic that can comprise hardware (e.g., circuitry, dedicated logic, programmable logic, microcode, etc.), software (e.g., instructions run on a processing device), or a combination thereof At 402, the transaction coordinator 313 receives a compiled net-change transaction log from net-change database 311 and further compiles the log into segments. In one embodiment, each table within the database can be separated into an insert segment, an update segment and a delete segment. For example if net-change database 311 contains the following transaction log:

Delete A where k1=3
Insert A values (10, 20, 1)
Insert B values (10, 11, 11, 10, 10)
Insert B values (20, 21, 21, 20, 20)
Insert B values (30, 30, 30, 30, 40)
Update A set c1=1, c2=2 where k1=10

Transaction coordinator 313 can create an insert, update, and delete segment for Table A, and an insert, update, and delete segment for Table B. The insert segment for Table A would contain the following commands:

Insert A values (10, 20, 1)

The update segment for Table A would contain the following commands:

Update A set c1-1, c2=2 where k1=10

The delete segment for Table A would contain the following commands:

Delete A where k1=3

For Table B, the insert segment would contain the following commands:

Insert B values (10, 11, 11, 10, 10)
Insert B values (20, 21, 21, 20, 20)
Insert B values (30, 30, 30, 30, 40)

Both the update and delete segments for Table B would be empty since no such commands exist in the example above. Once the segments have been created, the method can move to 404 in which the transaction coordinator 313 can determine the order in which to apply the segments, and can also determine which segments can be applied concurrently. As an example the transaction coordinator can operate using the following rules:

1. For any two compiled tables (say A and B as an example), if A and B have no referential relationships, A segments and B segments can be applied in parallel.

2. If A has a referential relationship to B, then A should be applied after B (and vice versa if B has a referential relationship to A.)

3. If a delete segment shares no data row with an insert segment, the delete segment and insert segment of a table can be applied in parallel.

4. Update segments of a table can be applied in parallel with the insert and delete segments of the same table.

Using the example above, the Insert A segment and the Insert B segment commands can be applied simultaneously at 406 to the target database 307, since the segments operate on different portions of the database and thus are mutually exclusive.

In addition, the update A segment and update B segment can be applied simultaneously at 406 with the insert A and insert B segments since the log compilation method described in FIG. 2 ensures that update segments and insert segments will not conflict with each other if applied simultaneously (i.e., in parallel). Since the method outlined in FIG. 2 will combine insert commands and update commands that act on the same data into one transaction, there is no risk of conflict if an insert and update command are performed simultaneously.

Also, due the log compilation outlined in FIG. 2, the transaction coordinator 313 will first apply the delete segments at 406 prior to simultaneously performing the update and insert segments. Since the log compilation method outlined in FIG. 2 ensures that deleted rows are not updated in the replicate database (for instance a command to update A followed by a command to delete A, would result in a net change of A being deleted), the transaction coordinator 313 applies the delete segment at 406 first and then will apply the insert and updates segments simultaneously.

In other embodiments, the transaction coordinator 313 can also make decisions to apply segments concurrently based on how long it would take a particular segment to be applied to the database. As an example if an Insert A segment would take 10 seconds, whereas an Insert B and Update B segments would take 2 seconds to be applied to the database, the transaction coordinator can apply the Insert B and Update B segments concurrently while opting to apply the Insert A segment either before or after. In this way, the Insert B and Update B segments can be applied quickly rather than having to wait for the Insert A segment to be applied.

In other embodiments, transaction coordinator 313 at 402 can create segments based on other criteria rather than insert, update, and delete segments. As an example, a group of transactions that contain frequent DDL, SQL, only insert commands or stored procedure replications, would not benefit from having the transactions compiled into insert, update and delete segments. In this situation, as an example, the transaction coordinator 313 can determine that performing a per table compilation may provide better efficiency to the modification of the replicate database. As an example, if a transaction log contained the following entries:

Insert A
Update B
Delete A
Create table C
Insert C
Update A

A per table complication would create three segments as follows

Segment 1: Insert A, Delete A and Update A
Segment 2: Update B
Segment 3: Create table C, Insert C So long as table A, B and C don't contain referential constraints, the three segments can be applied in parallel. However in the instance in which the table does contain referential constraints, the segments may be modified. Using the example above, if as an example, tables A and B both had referential constraints whereas table C did not, the segments can be modified in order to account for the referential constraints. The table A segment (segment 1) and the table B segment (segment 2) can be collapsed into one segment. The combined segment can then be applied in parallel to segment 3. The transaction coordinator 313 can profile the incoming transaction log, to determine what compilation method to utilize based on what commands are contained within the transaction log.

In addition to determining the order in which to apply commands to a replicate database, the transaction coordinator 313 can also ensure that the transactions applied to the replicate database maintain the atomicity of the replicate database. In other words, the transaction coordinator 313 can ensure that the parallel transactions either are all applied to the replicate database successfully, otherwise none of the transactions will be allowed to occur. As an example if a user of a database issues the following commands: update A and insert B, according to the method outlined by FIG. 4, the two commands will be applied to the replicate database in parallel. However, if the update A command is applied successfully to the replicate database while application of insert B command fails due to some database error, the atomicity property of the replicate database is violated. The transaction coordinator 313 can check to ensure that all parallel transactions have been applied successfully before committing the changes to the replicate database.

Figure 5:
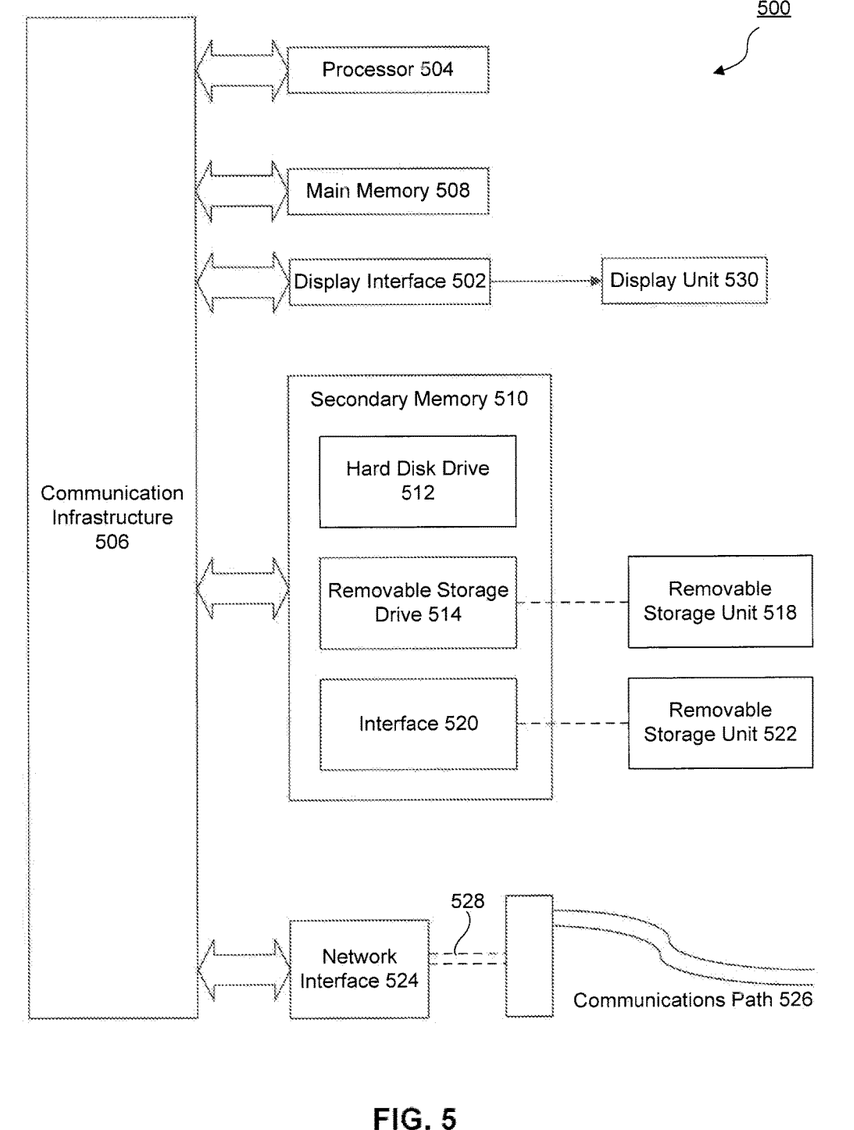
FIG. 5 illustrates an example computer useful for implementing components of embodiments of the disclosure.

Various aspects of the present disclosure can be implemented by software, firmware, hardware, or a combination thereof. FIG. 5 illustrates an example computer system 500 in which the present disclosure, or portions thereof, can be implemented as computer-readable code. For example, the methods illustrated by the flowchart of FIG. 2 or FIG. 4, can be implemented in system 500. Various embodiments of the disclosure are described in terms of this example computer system 500. After reading this description, it will become apparent to a person skilled in the relevant art how to implement the disclosure using other computer systems and/or computer architectures.

Computer system 500 includes one or more processors, such as processor 504. Processor 504 can be a special purpose or a general purpose processor. Processor 504 is connected to a communication infrastructure 506 (for example, a bus or network).

Computer system 500 also includes a main memory 508, preferably random access memory (RAM), and may also include a secondary memory 510. Secondary memory 510 may include, for example, a hard disk drive 512, a removable storage drive 514, and/or a memory stick. Removable storage drive 514 may comprise a floppy disk drive, a magnetic tape drive, an optical disk drive, a flash memory, or the like. The removable storage drive 514 reads from and/or writes to a removable storage unit 518 in a well-known manner. Removable storage unit 518 may comprise a floppy disk, magnetic tape, optical disk, etc. which is read by and written to by removable storage drive 514. As will be appreciated by persons skilled in the relevant art(s), removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 are in the form of signals which may be electronic, electromagnetic, optical, or other signals capable of being received by communications interface 524. These signals are provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Signals carried over communications path 526 can also embody the logic described herein. Computer program medium and computer usable medium can also refer to memories, such as main memory 508 and secondary memory 510, which can be memory semiconductors (e.g. DRAMs, etc.). These computer program products are means for providing software to computer system 500.

Computer programs (also called computer control logic) are stored in main memory 508 and/or secondary memory 510. Computer programs may also be received via communications interface 524. Such computer programs, when executed, enable computer system 500 to implement the present disclosure as discussed herein. In particular, the computer programs, when executed, enable processor 504 to implement the processes of the present disclosure, such as the method illustrated by the flowchart of FIGS. 2 and 4. Accordingly, such computer programs represent controllers of the computer system 500. Where the disclosure is implemented using software, the software may be stored in a computer program product and loaded into computer system 500 using removable storage drive 514, interface 520, hard drive 512 or communications interface 524.

The disclosure is also directed to computer program products comprising software stored on any computer useable medium. Such software, when executed in one or more data processing device, causes a data processing device(s) to operate as described herein. Embodiments of the disclosure employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

While various embodiments of the present disclosure have been described above, it should be understood that the embodiments have been presented by way of example only, and not limitation. It will be understood by those skilled in the relevant art(s) that various changes in form and details may be made therein without departing from the spirit and scope of the disclosure as defined in the appended claims. It should be understood that the disclosure is not limited to these examples. The disclosure is applicable to any elements operating as described herein. Accordingly, the breadth and scope of the present disclosure should not be limited by any of the above-described exemplary embodiments, but should be defined only in accordance with the following claims and their equivalents.

What is claimed is:

1. A method for data replication in a database system environment, the method comprising:
grouping, in-memory, a plurality of transactions from a source database system for replication to a target database system into a plurality of groups, wherein the grouping is based on a criterion, and wherein each transaction comprises a row change;
compiling a plurality of net row changes for the transactions in one of the groups based on a plurality of row changes included in the transactions, wherein a number of the net row changes is less than or equal to a number of the row changes;
organizing the compiled net row changes into a plurality of tables including an insert table, an update table, and a delete table, wherein the update table includes a plurality of update segments and wherein the insert table includes a plurality of insert segments, and wherein the applying the subset of the plurality of segments simultaneously to the target database system includes applying the plurality of update segments and insert segments simultaneously to the target database system; and
applying a plurality of the compiled net row changes from one of the tables simultaneously to the target database system.

2. The method of claim 1, wherein a plurality of segments of one or more of the tables are based on referential constraints of the plurality of transactions to be replicated.

3. The method of claim 2, wherein the plurality of segments are based on a per table basis.

4. The method of claim 1, wherein the method further comprises determining that atomicity of the target database is intact after the applying to the target database.

5. The method of claim 4, wherein the method further comprises un-doing the applying based on a determination that the atomicity of the replicate database is not intact upon application of the segments to the replicate database.

6. The method of claim 1, wherein the criterion is based on a determination that a number of transactions in a group is less than a pre-determined amount.

7. The method of claim 1, wherein the criterion is based on a determination that a transaction contains a non-compilable command, Wherein the compiling does not include compiling the non-compilable command, and wherein the non-compilable command is added to a non-compilable command table.

8. The method of claim 7, further comprising:
applying the transaction including the non-compilable command independently from the compiled transactions and based on a transaction log associated with the plurality of transactions.

9. A system for data replication in a database system environment, the system comprising: a processor:
a source database;
a target database in communication with the source database; and
a replication server in communication with the source database and target database, the replication server:
grouping, in-memory, a plurality of transactions for replication as a single transaction from a source database system to a target database system into a plurality of groups, wherein the grouping is based on a criterion, and wherein each transaction comprises a row change,
compiling a plurality of net row changes for transactions in one of the groups based on a plurality of row changes included in the transactions,
organizing the compiled net row changes into a plurality of tables including an insert table, an update table, and a delete table, wherein the update table includes a plurality of update segments and wherein the insert table includes a plurality of insert segments, and wherein the applying the subset of the plurality of segments simultaneously to the target database system includes applying the plurality of update segments and insert segments simultaneously to the target database system, and
applying a plurality of the compiled net row changes from one of the tables simultaneously to the target database system.

10. The system of claim 9, wherein a plurality of segments of one or more of the tables are based on referential constraints of the plurality of transactions to be replicated.

11. The system of claim 10, wherein the plurality of segments are based on a per table basis.

12. The system of claim 9, wherein the replication server further determines that the atomicity of the replicate database is intact after the applying to the target database.

13. The system of claim 9, wherein the replication server further un-does the applying if it is determined that the atomicity of the replicate database is not intact upon application of the segments to the replicate database.

14. A computer-readable storage device having instructions stored thereon, execution of which, by a computing device, causes the computing device to perform operations comprising:
   grouping, in-memory, a plurality of transactions from a source database system for replication to a target database system into a plurality of groups, wherein the grouping is based on a criterion, and wherein each transaction comprises a row change;
   compiling a plurality of net row changes for the transactions in one of the groups based on a plurality of row changes included in the transactions;
   organizing the compiled net row changes into a plurality of tables including an insert table, an update table, and a delete table, wherein the update table includes a plurality of update segments and wherein the insert table includes a plurality of insert segments, and wherein the applying the subset of the plurality of segments simultaneously to the target database system includes applying the plurality of update segments and insert segments simultaneously to the target database system; and
   applying a plurality of the compiled net row changes from one of the tables simultaneously to the target database system.

15. The device of claim 14, wherein a plurality of segments of one or more of the tables are based on referential constraints of the plurality of transactions to be replicated.

16. The device of claim 15, wherein the plurality of segments are based on a per table bases.

17. The device of claim 14, wherein the computer readable program code further enables a processor to determine that the atomicity of the replicate database is intact after the applying to the replicate database.

* * * * *